N. M. HANSEN.
TOOL.
APPLICATION FILED JUNE 1, 1908.

958,807.

Patented May 24, 1910.

Witnesses
M E Kirk
Hazel Kirk

Niels M. Hansen
Inventor
By Geo E Kirk
Attorney

UNITED STATES PATENT OFFICE.

NIELS MARTIN HANSEN, OF DUNDEE, MICHIGAN, ASSIGNOR TO DE VILBISS PLIER COMPANY, OF DUNDEE, MICHIGAN, A CORPORATION OF MICHIGAN.

TOOL.

958,807.  Specification of Letters Patent. Patented May 24, 1910.

Application filed June 1, 1908. Serial No. 435,884.

*To all whom it may concern:*

Be it known that I, NIELS M. HANSEN, a citizen of the United States, residing at Dundee, Monroe county, Michigan, have invented a certain new and useful Tool, of which the following is a specification.

This invention relates to a tool.

This invention has utility when embodied as a cutter, especially when adapted for operation by a pair of hand actuated levers.

Figure 1:
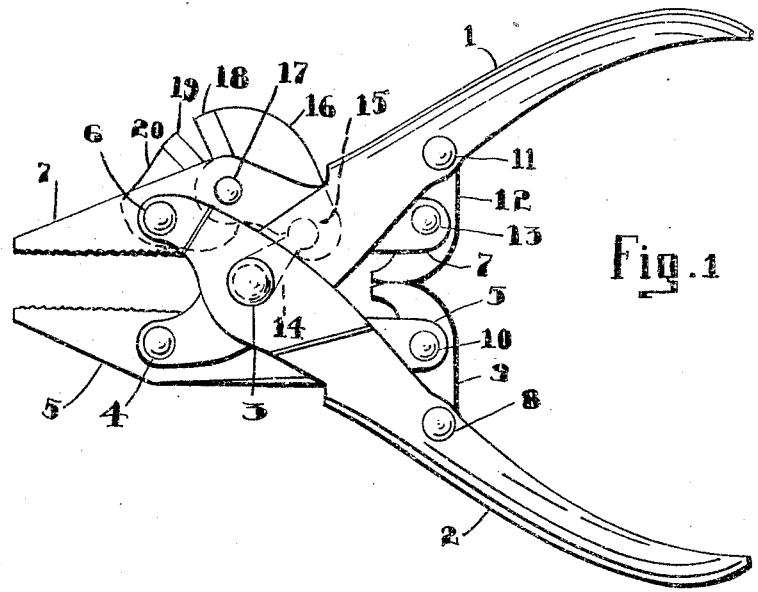
Figure 2:
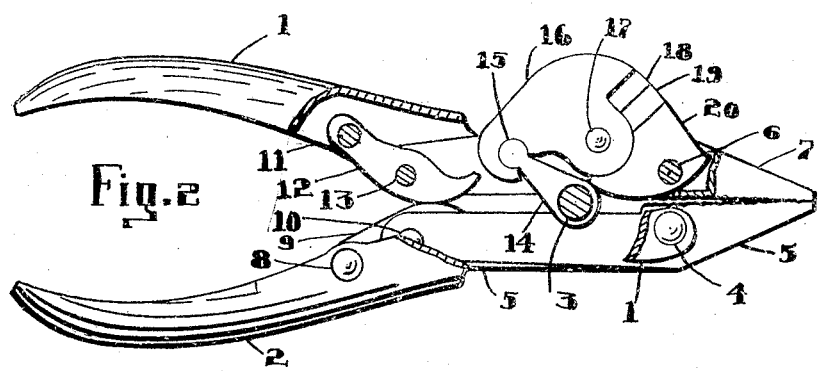
Figure 3:
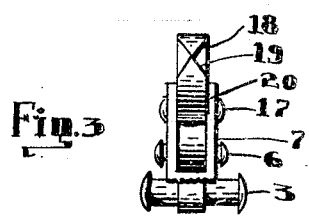

Referring to the drawings: Figure 1 is a side elevation of an embodiment of the invention in a tool as a cutter, the parts being shown in open position; Fig. 2 is a similar view, with parts broken away, but with the cutter moved to closed position; and Fig. 3 is a fragmentary detail, showing front or end elevation view of the cutter.

The hand actuated lever mechanism comprises the levers 1, 2, herein shown as crossed and having the common pivot 3. Lever 1, on the opposite side of pivot 3 from the grip portion, has pivotal connection 4 with element 5, while similarly, lever 2, on the opposite side of pivot 3 from the grip portion, has pivotal connection 6 with element 7.

Lever 2, near its grip portion, has, by means of pivot 8, the link 9, connected by pivot 10 to element 5. Lever 1, near its grip portion, has pivot pin 11 engaging in link 12, having pivotal connection 13 with the element 7. The pivots 10 and 13 are maintained the same distance apart as pivots 4 and 6, by means of the cam extensions of links 9 and 12 which coact with each other. Accordingly in all movements of the levers 1 and 2 relatively to each other, the elements 5 and 7 will be actuated toward or from each other in parallel planes.

Connected to be driven by the above mechanism is the tool proper, comprising the link 14 mounted on pivot 3, and having knuckle connection or pivot 15 engaging recess in member 16, having pivotal mounting 17 in element 7. This pivotally mounted member 16 is provided with a cutting edge 18, opposing which is cutting edge 19 of member 20, rigidly held in element 7 by coacting with pivot 6, as well as nesting about the bearing of member 16 surrounding the pivot 17. The cutter members 16, 20, each locked by pivots 6, 17, are further kept in position and laterally held by the parallel walls or faces of element 7.

In the particular embodiment of the invention herein disclosed, it is to be noted there is an absence of delicate parts to get out of order; that a minimum number of elements is used; that while of finished appearance, symmetrical and compact, the device is also amply strong.

Operation: Attention is directed to the position of the grip portions of the levers, Fig. 1, the distance apart of elements 5 and 7, herein shown as jaws of pliers, and the distance apart of cutting edges 18, 19, and then referring to Fig. 2, wherein the grip portions of levers 1, 2, have brought the jaws 5, 7, together, while the cutting edges 18, 19 have moved a less distance in closing. Accordingly the effective cutting mechanical advantage is greater than the mechanical advantage to be obtained between the elements 5, 7. This relative actuation of the working members 16, 20, is brought about by the variation of the distance between pivots 3 and 17. As the lever mechanism is operated to move the plane of element 7 toward the pivot 3, pivot 17 participates in this travel as it is carried by element 7, but simultaneously the link connection 14 coacts with member 16 to rock this cutting member on its pivot 17 toward the fixed member 20 of the cutter. While the pivots 3 and 17 approach each other, the line of action of link 14 is such as to make of the secondary lever or member 16 a most effective device. As disclosed, the tool embodies a pair of primary levers 1, 2, a cutter support or carrier member 7, a secondary lever 16 having a cutting edge 18, and a link connection 14. In this embodiment, to insure the desired line of travel of the support 7 from the primary levers, the support is partially restrained by link 12, the travel of which link is governed through coaction of its cam face with the cam of link 9, which latter link is limited in its movements through connection with the element 5. From this it will be seen that the particular system of elements coact as a unitary mechanism.

What is claimed and it is desired to secure by Letters Patent is:

1. A tool comprising a pair of hand actuable levers having a common pivot, a pair of cutting members, and a link connecting the lever pivot and one of the cutting members to permit actuation of the cutter from the levers.

2. A pair of hand actuable levers having a common pivot, a pair of parallel moving elements, a cutter having a member carried by an element, and a link connecting the lever pivot and the cutter member to permit actuation of the cutter from the levers.

3. A cutting tool embodying a pair of primary levers having a common pivot, a secondary lever, and an intermediate link connection between the primary lever pivot and secondary lever.

4. A cutter embodying a pivoted member, a second member, a support for the members in which the second member is relatively fixed, said second member having a seat in which the pivoted member coacts to hold the second member, and a pair of operating levers for the cutter.

5. A tool having a working member, a support to which the member is fixed at one point, and an additional relatively rockable holding device for the member including a semi-circular pivoted member nesting in a seat in the working member to positively hold the working member against movement relatively to its support.

6. A cutting tool having a pair of working members, a pivot for each member said pivots spaced from each other, one of said members being capable of relative rocking movement and having a semi-circular extension about its pivot, said extension nesting in a seat in the other member to hold said other member from rocking, and a support for the pivots.

In witness whereof I affix my signature in the presence of two witnesses.

NIELS MARTIN HANSEN.

Witnesses:
ALLEN DE VILBISS, Jr.,
SETH C. DIXON.